Patented Aug. 28, 1928.

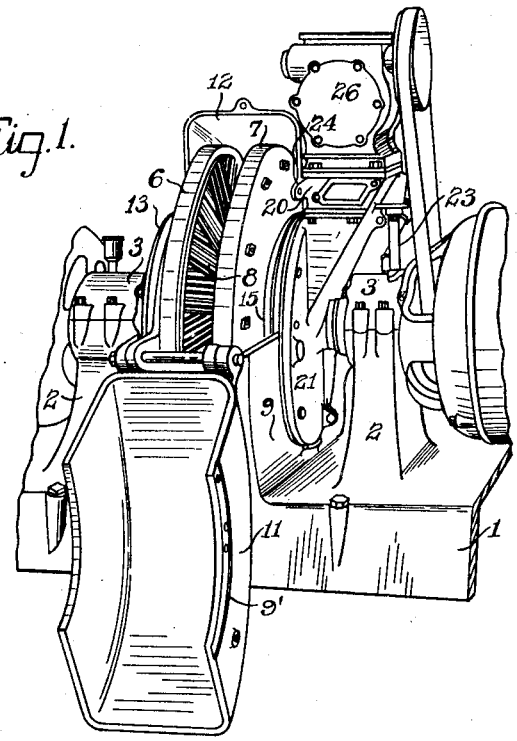

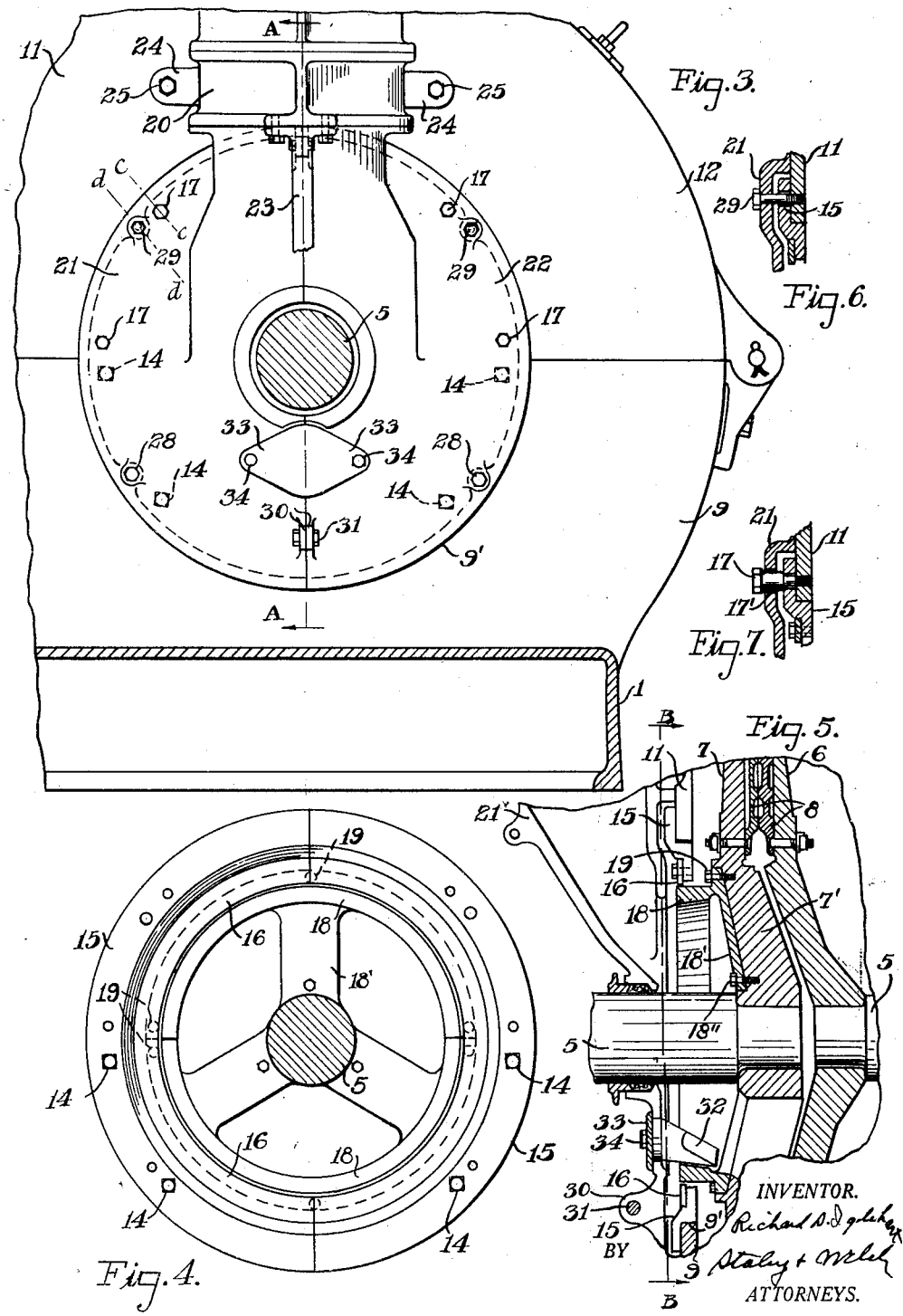

1,682,128

UNITED STATES PATENT OFFICE.

RICHARD S. IGLEHART, OF SPRINGFIELD, OHIO, ASSIGNOR TO THE BAUER BROTHERS COMPANY, OF SPRINGFIELD, OHIO, A CORPORATION OF OHIO.

ATTRITION MILL.

Application filed March 23, 1927. Serial No. 177,755.

This invention relates to improvements in attrition mills, it more particularly relating to that type of mill which employs opposed grinding disks through the center of one of which the material to be ground is fed by means of a spout and in which there is employed co-operating rings to prevent leakage of material at the point where it leaves the spout and feeds to the disks.

One of the objects of the invention is to provide a form of spout, a portion of which can be removed without disturbing the remainder in such a way that access may be had to the complete rings so that the rings may be readily removed for repairs or otherwise.

A further object of the invention is to provide an improved manner of mounting the seal ring to permit the more ready removal of the spout sections and to also permit the seal ring to be mounted and held in more accurate relation with the co-operating wear ring.

A further object of the invention is to provide an improved form of wiper for the wear ring so that the wiper may be readily removed for renewal purposes when desired without disturbing the balance of the structure, may be made of a material suitable for the purpose, and may simplify the casting of the wiper and parts associated therewith.

Other objects will appear from the accompanying description, claims and statements of advantages.

In the accompanying drawings:

Fig. 1 is a perspective view of a portion of a machine embodying my improvements.

Fig. 2 is a view partly in longitudinal section and partly in side elevation.

Fig. 3 is an end elevation showing the base and one of the shafts in section.

Fig. 4 is a section on the line B—B of Fig. 5.

Fig. 5 is a section on the line A—A of Fig. 3.

Fig. 6 is a detail in section on the line d—d of Fig. 3.

Fig. 7 is a detail in section on the line c—c of Fig. 3.

Referring to the drawings, 1 represents the base which has a pair of integrally formed standards 2, the upper ends of which have housings 3 for the drive shafts 5 for the heads 6 and 7 which carry the grinding plates 8. The base also has integrally formed supporting walls 9 and 10 each of which is provided with a circular recess 9' and 10', and there are two hinged casing members 11 and 12 hinged to these walls correspondingly recessed to provide circular openings, one of which is closed by the circular plate 13. Fitted to the recessed portion 9' of the wall 9 and secured thereto by bolts 14 is the shouldered portion of a supporting ring 15 for a seal ring 16, the upper portion of the supporting ring 15 being secured to the hinged casing members by shouldered studs 17. The recessed portion of the wall is finished in accurate concentric relation to the axis of rotation of the drive shaft to insure the proper mounting of the seal ring, and this seal ring and its supporting ring are made in section, preferably each in two sections as shown. A wear ring, co-operating with the seal ring, is indicated at 18, and has arms 18' secured to the arms 7' of the head 7 by cap screws 18'' and bolts 19 in concentric relation with the seal ring. The wear ring is made in preferably two sections as shown.

The spout which I employ consists of a stationary portion called the connecting spout, and a removable portion designated as the deflecting spout which is divided on a vertical center line into two sections 21 and 22. The stationary spout portion 20 is supported from one of the bearing housings 3 by a support 23 and also has a pair of arms 24 which are secured to the respective hinged casing members 11 and 12 by the bolts 25. This stationary spout section supports in some cases a feeding device which is indicated at 26 in Fig. 1, and in some cases a spout 27 for a pipe connection such as is shown in Fig. 2. Each of the two sections 21 and 22 is connected at its lower end to the wall 9 by the bolts 28 and at their upper ends are connected to the casing members 11 and 12 by bolts 29 which pass through the ring 15. The sections are also provided with aligned adjacent ears 30 by which they may be bolted together by the bolts 31. The studs 17 which connect the upper portion of the seal ring with the casing members 11 and 12 are such as to be accessible through the spout sections so that the upper portion of the seal ring may be disconnected, as well as the spout members, from the casing members 11 and 12 when it is desired to obtain access to the interior of the casing without disturbing the spout members and seal ring and to that end the spout members are each provided with a clearance hole 17' for that purpose.

The wiper for the flanged portion 18 of the wear ring is indicated at 32 and in the present case the outer end thereof is cast with a plate which forms in effect a pair of ears 33 which fit over and close an opening in the deflecting spout sections and are bolted to the respective sections by bolts 34.

It will be observed that the division point between the stationary spout member 20 and the deflecting spout sections 21 and 22 is above the extreme upper edge of the supporting ring 15 so that when these divided spout sections are removed, both the entire seal ring support as well as the wear ring are exposed so that they can be readily removed. It will also be observed that these divided spout sections can be removed without disturbing the spout section 20 or the parts supported thereby such as the feeder 26 or the spout 27.

By the arrangement of the wiper described, this wiper may be readily removed for repairs or otherwise. In this connection it should be explained that it has heretofore been the practice to cast the wiper on the spout sections, which will make apparent the further advantage that by the present arrangement the wiper may be cast of a different and harder material than the spout sections and also effects economy in manufacture due to the difficulty of casting the wiper with the spout sections and avoids the necessity of accurately matching up the two members of the wiper when cast with the spout sections.

Having thus described my invention, I claim:

1. In an attrition mill, a rotatable grinding head, a drive shaft for said head, a rotatable ring secured to said head, a second stationary ring co-operating with said movable ring, a spout leading to the center of said head, said spout consisting in part of a removable portion divided vertically through which said shaft passes, the sections of said removable portion being extended to a point above the highest point of said rings so as to expose the entire rings when said sections are removed.

2. In an attrition mill, a rotatable grinding head, a drive shaft for said head, a rotatable ring secured to said head, a second stationary ring co-operating with said movable ring, a spout leading to the center of said head, said spout comprising a stationary connecting spout member and a removable deflecting spout member, with the shaft passing through said last mentioned member, said removable deflecting spout member being divided vertically, the points of juncture between said spout members being above the highest point of said rings so as to expose the entire rings when said deflecting spout member is removed.

3. In an attrition mill, a base having a supporting wall, a rotatable grinding head, a drive shaft for said member, a rotatable ring secured to said head, a second stationary ring secured to said wall, a spout leading to the center of said head, said spout consisting in part of a removable portion divided vertically, with the shaft passing therethrough, the sections of which extend to a point above the highest point of said rings, for the purpose specified.

4. In an attrition mill, a base having a supporting wall, a rotatable grinding member, a drive shaft for said member, a rotatable ring secured to said head, a second stationary ring surrounding said movable ring and co-operating therewith, a spout leading to the center of said head, said spout consisting of a stationary member and a removable member, with the shaft passing through said removable member, said removable member being divided vertically into two sections, together with means for securing said sections to said wall, the point of juncture between said spout members being above the highest points of said rings, for the purpose specified.

5. In an attrition mill, a supporting base, a pair of casing members hinged to said base, a rotatable grinding head in said casing members, a drive shaft for said head, a rotatable ring secured to said head, a second stationary ring surrounding said removable ring and co-operating therewith, means for removably securing said stationary ring to said base and to said casing members, a spout leading to the center of said head, said spout consisting of a stationary member and a removable member, with a drive shaft passing through said removable member, the removable member of said spout being divided vertically into two sections, and means for removably securing said sections to said base and to said casing members.

6. In an attrition mill, a base having a vertical supporting wall provided with a semi-circular recess, a rotatable grinding head mounted on said base, a drive shaft for said head in concentric relation with the wall of said recess, a rotatable ring secured to said head, a second stationary ring co-operating with said removable ring and mounted on the wall of said recess and removably secured to said wall, and a spout leading to the center of said head having a removable portion divided vertically through which said shaft passes.

7. In an attrition mill, a base, a pair of vertical supporting walls on said base, a pair of casing members hinged to said supporting walls, one of said walls being provided with a semi-circular recess, a rotatable head mounted on said base within said casing members, a drive shaft for said member, the wall of said recess being in concentric relation with the axis of rotation of said shaft, a rotatable ring secured to said head, a second stationary ring co-operating with said rotatable ring, said stationary ring having a shouldered portion resting on the wall of said recess and removably secured thereto, said stationary ring also being removably secured to said casing members, and a spout leading to the center of said head through which said shaft passes and having a portion divided vertically, together with means for securing said divided spout portion to said vertical recessed wall and to said casing members.

8. In an attrition mill, a supporting base, a pair of hinged casing members hinged to said base, a rotatable grinding head in said casing members, a drive shaft for said head, a rotatable ring connected with said head, a stationary ring co-operating with said rotatable ring, removable means for securing said stationary ring to said base, a removable spout section divided vertically through which said shaft passes, means for securing said spout sections to said base, and means accessible through said spout sections for removably securing said stationary ring to said casing members.

9. In an attrition mill, a rotatable grinding head, a drive shaft for said head, a ring secured to and rotatable with said head, a spout leading to the center of said head through which said shaft passes, said spout being provided with an aperture, and a wiper insertable through said aperture, together with means for securing the same to said spout.

10. In an attrition mill, a rotatable grinding head, a drive shaft for said head, a rotatable ring secured to said head, a spout leading to the center of said head, divided vertically and through which said shaft passes, said spout having an aperture, and a wiper for said ring insertable through said aperture, together with means for securing the same to the respective spout sections.

In testimony whereof, I have hereunto set my hand this 3rd day of March, 1927.

RICHARD S. IGLEHART.